US009503382B2

United States Patent
DeCusatis et al.

(10) Patent No.: US 9,503,382 B2
(45) Date of Patent: *Nov. 22, 2016

(54) SCALABLE FLOW AND COGESTION CONTROL WITH OPENFLOW

(71) Applicant: International Business Machines Corporation, Armonk, NY (US)

(72) Inventors: Casimer DeCusatis, Poughkeepsie, NY (US); Petrini Fabrizio, Millwood, NY (US); Rajaram B. Krishnamurthy, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/501,945

(22) Filed: Sep. 30, 2014

(65) Prior Publication Data
US 2015/0055476 A1 Feb. 26, 2015

Related U.S. Application Data

(63) Continuation of application No. 13/833,952, filed on Mar. 15, 2013.

(51) Int. Cl.
*H04L 12/825* (2013.01)
*H04L 12/801* (2013.01)
(Continued)

(52) U.S. Cl.
CPC ............. *H04L 47/25* (2013.01); *H04L 47/11* (2013.01); *H04L 12/569* (2013.01); *H04L 47/12* (2013.01); *H04L 47/21* (2013.01); *H04L 47/215* (2013.01)

(58) Field of Classification Search
None
See application file for complete search history.

(56) References Cited

U.S. PATENT DOCUMENTS 5,694,390 A    12/1997   Yamato
5,905,711 A *   5/1999   Chiussi ................. H04L 49/255
                                                      370/232

(Continued)

FOREIGN PATENT DOCUMENTS

CN     101313278 A    11/2008
CN     101398770 A     4/2009

(Continued)

OTHER PUBLICATIONS

Anonymous; "Intelligent VM Migration Based on Relative VM Priority and Relative Suitability of Migration Target"; http://priorartdatabase.com/IPCOM/000201632; Nov. 16, 2010, 3 pages.

(Continued)

*Primary Examiner* — Andrew Oh
(74) *Attorney, Agent, or Firm* — Cantor Colburn LLP; Steven Chiu

(57) ABSTRACT

A method of performing congestion management in a network is provided. The method includes monitoring a congestion status at a switch in the network. It is determined at the switch that the congestion status indicates that there is congestion at the switch. Based on the congestion being related to data received at the switch from a source at a first rate, a first message is transmitted from the switch to the source requesting the source to send the data at a second rate that is slower than the first rate. Based on the congestion being related to data requests received at the switch from a destination at third rate, a second message is transmitted from the switch to the destination requesting the destination to request the data at a fourth rate slower than the third rate.

14 Claims, 3 Drawing Sheets

(51) Int. Cl.
  *H04L 12/819* (2013.01)
  *H04L 12/54* (2013.01)

(56) References Cited

U.S. PATENT DOCUMENTS

| | | | |
|---|---|---|---|
| 5,966,546 A | 10/1999 | Thomas | |
| 6,094,418 A | 7/2000 | Soumiya et al. | |
| 6,208,619 B1 | 3/2001 | Takeuchi | |
| 6,356,944 B1 | 3/2002 | McCarty | |
| 6,504,818 B1 | 1/2003 | Levine | |
| 6,504,821 B2 | 1/2003 | Berger | |
| 6,795,399 B1 | 9/2004 | Benmohamed et al. | |
| 6,813,246 B1 | 11/2004 | Phan et al. | |
| 6,947,380 B1 | 9/2005 | Yip et al. | |
| 6,975,592 B1* | 12/2005 | Seddigh | H04L 47/10 370/230 |
| 7,187,652 B2 | 3/2007 | Lee et al. | |
| 7,234,073 B1 | 6/2007 | Roytman et al. | |
| 7,289,453 B2 | 10/2007 | Riedel et al. | |
| 7,408,876 B1 | 8/2008 | Gupta | |
| 7,765,328 B2 | 7/2010 | Bryers et al. | |
| 7,949,893 B1 | 5/2011 | Knaus et al. | |
| 7,978,607 B1 | 7/2011 | Halabi et al. | |
| 8,069,139 B2 | 11/2011 | Garbow et al. | |
| 8,082,466 B2 | 12/2011 | Tanaka et al. | |
| 8,429,282 B1 | 4/2013 | Ahuja | |
| 8,630,307 B2 | 1/2014 | Wu et al. | |
| 8,724,470 B2* | 5/2014 | Yi | H04L 47/14 370/235 |
| 8,762,501 B2* | 6/2014 | Kempf | H04L 12/4633 709/220 |
| 8,953,453 B1 | 2/2015 | Xiao et al. | |
| 2001/0056459 A1* | 12/2001 | Kurose | H04L 12/5695 709/201 |
| 2002/0073354 A1 | 6/2002 | Schroiff et al. | |
| 2002/0159386 A1 | 10/2002 | Grosdidier et al. | |
| 2002/0181484 A1 | 12/2002 | Aimoto | |
| 2002/0196749 A1* | 12/2002 | Eyuboglu | H04J 3/0682 370/328 |
| 2003/0051187 A1 | 3/2003 | Mashayekhi et al. | |
| 2004/0153866 A1 | 8/2004 | Guimbellot et al. | |
| 2004/0170123 A1 | 9/2004 | Carpenter et al. | |
| 2004/0179476 A1 | 9/2004 | Kim et al. | |
| 2004/0228278 A1 | 11/2004 | Bruckman et al. | |
| 2006/0126509 A1* | 6/2006 | Abi-Nassif | H04L 47/10 370/235 |
| 2006/0187874 A1* | 8/2006 | Zaki | H04L 1/0028 370/328 |
| 2006/0203828 A1 | 9/2006 | Kumazawa | |
| 2006/0209695 A1* | 9/2006 | Archer | G06F 9/50 370/235 |
| 2006/0215550 A1 | 9/2006 | Malhotra | |
| 2007/0081454 A1 | 4/2007 | Bergamasco et al. | |
| 2007/0183332 A1 | 8/2007 | Oh | |
| 2007/0204266 A1 | 8/2007 | Beaty et al. | |
| 2007/0220121 A1 | 9/2007 | Suwarna | |
| 2007/0263540 A1 | 11/2007 | Charzinski et al. | |
| 2008/0137669 A1 | 6/2008 | Balandina et al. | |
| 2008/0192752 A1 | 8/2008 | Hyslop et al. | |
| 2008/0225713 A1 | 9/2008 | Tychon et al. | |
| 2008/0298248 A1 | 12/2008 | Roeck et al. | |
| 2009/0052326 A1 | 2/2009 | Bergamasco et al. | |
| 2009/0089609 A1 | 4/2009 | Baba | |
| 2009/0092046 A1* | 4/2009 | Naven | H04L 47/10 370/230 |
| 2009/0180380 A1 | 7/2009 | Prabhakar et al. | |
| 2009/0203350 A1* | 8/2009 | Gottlieb | G08B 25/005 455/404.1 |
| 2009/0213861 A1 | 8/2009 | Benner et al. | |
| 2009/0231997 A1 | 9/2009 | Yang et al. | |
| 2009/0232001 A1 | 9/2009 | Gong et al. | |
| 2009/0268614 A1 | 10/2009 | Tay | |
| 2010/0014487 A1 | 1/2010 | Attar et al. | |
| 2010/0027420 A1 | 2/2010 | Smith | |
| 2010/0027424 A1 | 2/2010 | Radunovic et al. | |
| 2010/0138686 A1 | 6/2010 | Arata et al. | |
| 2010/0142539 A1 | 6/2010 | Gooch | |
| 2010/0146327 A1 | 6/2010 | Takubo | |
| 2010/0166424 A1 | 7/2010 | Nagarajan et al. | |
| 2010/0211718 A1 | 8/2010 | Gratz | |
| 2010/0214970 A1 | 8/2010 | Brunner et al. | |
| 2010/0238803 A1 | 9/2010 | Racz et al. | |
| 2010/0238805 A1 | 9/2010 | Ludwig et al. | |
| 2010/0281178 A1 | 11/2010 | Sullivan | |
| 2010/0302935 A1 | 12/2010 | Zhang et al. | |
| 2010/0303238 A1* | 12/2010 | Cakulev | H04L 63/0428 380/272 |
| 2010/0309781 A1 | 12/2010 | Wang et al. | |
| 2011/0026437 A1 | 2/2011 | Roja-Cessa et al. | |
| 2011/0031082 A1* | 2/2011 | Chi | A45C 5/145 190/18 A |
| 2011/0032821 A1 | 2/2011 | Morrill et al. | |
| 2011/0085444 A1 | 4/2011 | Ko et al. | |
| 2011/0090797 A1 | 4/2011 | Beecroft | |
| 2011/0135305 A1 | 6/2011 | Barnard et al. | |
| 2011/0137772 A1 | 6/2011 | Davis, III et al. | |
| 2011/0142450 A1 | 6/2011 | Tanzi et al. | |
| 2011/0158647 A1 | 6/2011 | Solheim et al. | |
| 2011/0158658 A1 | 6/2011 | Myslinski et al. | |
| 2011/0179415 A1 | 7/2011 | Donnellan et al. | |
| 2011/0206025 A1* | 8/2011 | Cadenas Gonzalez | H04W 64/003 370/338 |
| 2011/0211834 A1 | 9/2011 | Ansari et al. | |
| 2011/0242966 A1 | 10/2011 | Van Caenegem et al. | |
| 2011/0256865 A1* | 10/2011 | Sayeed | H04B 7/18589 455/427 |
| 2011/0261696 A1 | 10/2011 | Crisan et al. | |
| 2011/0261831 A1 | 10/2011 | Sharma et al. | |
| 2011/0271007 A1 | 11/2011 | Wang et al. | |
| 2011/0273988 A1 | 11/2011 | Tourrilhes et al. | |
| 2011/0283016 A1 | 11/2011 | Uchida | |
| 2011/0286324 A1 | 11/2011 | Bellagamba et al. | |
| 2011/0292830 A1 | 12/2011 | Yanggratoke et al. | |
| 2011/0295996 A1 | 12/2011 | Qiu | |
| 2011/0299389 A1 | 12/2011 | Mau et al. | |
| 2011/0305167 A1 | 12/2011 | Koide | |
| 2011/0305288 A1 | 12/2011 | Liu et al. | |
| 2012/0008958 A1 | 1/2012 | Dahlfort et al. | |
| 2012/0014284 A1 | 1/2012 | Ranganathan et al. | |
| 2012/0014693 A1 | 1/2012 | Cheng et al. | |
| 2012/0020361 A1 | 1/2012 | Ueno et al. | |
| 2012/0023231 A1 | 1/2012 | Ueno | |
| 2012/0030306 A1 | 2/2012 | Kami | |
| 2012/0054079 A1* | 3/2012 | Hayashi | G06Q 30/04 705/34 |
| 2012/0063316 A1 | 3/2012 | Ghanwani et al. | |
| 2012/0163175 A1 | 6/2012 | Gupta et al. | |
| 2012/0170477 A1* | 7/2012 | Hieda | H04L 12/4625 370/252 |
| 2012/0195201 A1 | 8/2012 | Ishikawa | |
| 2012/0201140 A1* | 8/2012 | Suzuki | H04L 45/22 370/235 |
| 2012/0207175 A1* | 8/2012 | Raman | H04L 47/125 370/412 |
| 2012/0221887 A1 | 8/2012 | Hansson et al. | |
| 2012/0243476 A1* | 9/2012 | Eyuboglu | H04J 3/0682 370/328 |
| 2012/0250496 A1 | 10/2012 | Kato | |
| 2012/0287782 A1 | 11/2012 | Lv et al. | |
| 2013/0003735 A1* | 1/2013 | Chao | H04L 45/66 370/392 |
| 2013/0010600 A1 | 1/2013 | Jocha et al. | |
| 2013/0054761 A1* | 2/2013 | Kempf | H04L 47/781 709/220 |
| 2013/0058345 A1* | 3/2013 | Kano | H04L 12/4633 370/392 |
| 2013/0124683 A1 | 5/2013 | Watanable | |
| 2013/0144995 A1* | 6/2013 | Ishii | H04L 12/4645 709/220 |
| 2013/0159415 A1 | 6/2013 | Kamiya et al. | |
| 2013/0162038 A1 | 6/2013 | Falk et al. | |
| 2013/0176850 A1* | 7/2013 | Mishra | H04L 49/00 370/235 |

(56) References Cited

U.S. PATENT DOCUMENTS

| | | | |
|---|---|---|---|
| 2013/0205002 A1 | 8/2013 | Wang et al. | |
| 2013/0212578 A1 | 8/2013 | Garg et al. | |
| 2013/0250770 A1* | 9/2013 | Zou | H04L 47/19 370/238 |
| 2013/0258843 A1 | 10/2013 | Kurita | |
| 2013/0258847 A1 | 10/2013 | Zhang et al. | |
| 2013/0266317 A1 | 10/2013 | Wang | |
| 2013/0268686 A1 | 10/2013 | Wang et al. | |
| 2013/0294236 A1* | 11/2013 | Beheshti-Zavareh | H04L 47/22 370/235 |
| 2014/0006630 A1 | 1/2014 | Cai | |
| 2014/0010235 A1* | 1/2014 | Ueno | H04L 45/745 370/392 |
| 2014/0016476 A1* | 1/2014 | Dietz | H04L 43/0817 370/238 |
| 2014/0016647 A1 | 1/2014 | Yoshida et al. | |
| 2014/0040526 A1 | 2/2014 | Chang et al. | |
| 2014/0092907 A1 | 4/2014 | Sridhar et al. | |
| 2014/0108632 A1* | 4/2014 | Narasimha | H04L 45/38 709/223 |
| 2014/0119193 A1 | 5/2014 | Anand et al. | |
| 2014/0126907 A1* | 5/2014 | Hirth | H04Q 11/0062 398/58 |
| 2014/0146681 A1 | 5/2014 | Gusavec et al. | |
| 2014/0169189 A1 | 6/2014 | Kalkunte | |
| 2014/0178066 A1 | 6/2014 | Patel et al. | |
| 2014/0192646 A1 | 7/2014 | Mir | |
| 2014/0258774 A1 | 9/2014 | Taylor et al. | |
| 2014/0301204 A1 | 10/2014 | Koshimizu | |

FOREIGN PATENT DOCUMENTS

| | | |
|---|---|---|
| CN | 101677321 A | 3/2010 |
| CN | 101997644 A | 3/2011 |
| CN | 102291389 A | 12/2011 |
| EP | 0876023 | 11/1998 |
| GB | 2313268 A | 5/1996 |
| JP | 2011166700 A | 8/2011 |
| WO | 9930462 | 6/1999 |
| WO | 2009113106 A2 | 9/2009 |
| WO | 2011037104 A1 | 9/2010 |
| WO | 2011037148 A1 | 3/2011 |
| WO | 2011065268 A1 | 3/2011 |
| WO | 2011118575 A1 | 9/2011 |
| WO | 2012056816 A | 5/2012 |

OTHER PUBLICATIONS

Anonymous; "Management framework for efficient live migration of virtual machines running migration-aware applications";http://priorartdatabase.com/IPCOM000200260; Oct. 3, 2010, 5 pages.

Curtis, et al. "DevoFlow: Scaling Flow Management for High-Performance Netowrks". SIGCOMM'11, Aug. 15-19, 2011, Toronto, Ontario, Canada.

Egilmez, et al. "Scalable video streaming over OpenFlow networks: An optimization framework for QoS Routing". 2011 18th IEEE International Confernece on Image Processing (ICIP), 2241-2244.

El-Azzab, et al. "Slices isolator for a virtualized openflow node", (2011) First International Symposium on Network Cloud Computing and Applications (NCCA), 121-126.

IBM "Software Defined Networking, A new paradigm for virtual dynamic, flexible networking," IBM Systems and Technology, Oct. 2012, 6 pages.

IBM; "The automatic determination of master-slave relationship between embedded controllers by mearns of a shared hardware access switch"; http://www.ip.com/pubview/IPCOM000020741D; Dec. 11, 2003, 5 pages.

Johnson, RD.et al.; "Detection of a Working Master Controller by a Slave Card"; http://www.ip.com/pubview/IPCOM000099594D; Feb. 1, 1990, 3 pages.

Li, Z., et al. Compatib le TDM/WDM PON using a Single Tunable Optical Filter for both Downstream Wavelength Selection and Upstream Wavelength Generation. IEEE Photonics Technology Letters, vol. 24, No. 10, May 15, 2012. pp. 797-799.

Liu, et al. "Open Flow-based Wavelength Path Control in Transparent Optical networks: a Proof-of-Concept Demonstration" Sep. 2011, 37th European conference and Exhibition on Optical communication (ECOC).

McKeown et al., "OpenFlow: Enabling Innovation in Campus Networks", Mar. 14, 2008, 6 pages.

Notification of Transmittal of the International Search Report and the Written Opinion of the International Searching Authority, or the Declaration; PCT/IB2014/059457; Mailed Jul. 1, 2014, 6 pages.

PCT Notification of Transmittal of the International Search Report and the Written Opinion of the International Searching Authority, or the Declaration, Application No. PCT/IB2014/059459; International Filing Date: Mar. 5, 2014; Date of Mailing: Jun. 30, 2014; 10 pages.

PCT Notification of Transmittal of the International Search Report/ Written Opinion of the International Searching Authority, or the Declaration, Application No. PCT/IB2014/059460; International Filing Date: Mar. 5, 2014; Mailed Jun. 30, 2014, 9 pages.

Pfaff, B.et al.; "Open Flow Switch Specification"; www.openflow.org/document/openflow_spec_v1.0.0.pdf; Feb. 28, 2011, 56 pages.

Wang et al., "Dynamic Bandwidth Allocation for Preventing Congestion in Data Center Networks," ISNN 2011, Part III, LNCS 6677, pp. 160-167, 2011.

Yong, S. et al, "XOR Retransmission in Multicast Error Recovery". Networks, 2000 (ICON2000). Proceedings. IEEE International Conference. pp. 336-340.

U.S. Appl. No. 13/833,886; Non-Final Office Action; Date Filed: Mar. 15, 2013; Date Mailed: Dec. 17, 2014; 32 pages.

U.S. Appl. No. 13/833,796; Non-final Office Action ; Date Filed Mar. 15, 2013; Date Mailed: Dec. 19, 2014; 31pages.

U.S. Appl. No. 13/833,848; Notice of Allowance; Date Filed Mar. 15, 2013; Date Mailed: Dec. 17, 2014; 28 pages.

U.S. Appl. No. 13/833,952; Non-FinalOffice Action; Date Filed: Mar. 15, 2013; Date Mailed: Nov. 3, 2014; 39 pages.

U.S. Appl. No. 13/834,020; Notice of Allowance, Date Filed: Mar. 15, 2013; Date Mailed; Nov. 20, 2014; 26 pages.

U.S. Appl. No. 13/834,117; Non-Final Office Action; Date Filed: Mar. 15, 2013; Date Mailed: Feb. 26, 2015, 61 pages.

U.S. Appl. No. 13/834,502; Non-Final Office Action; Date Filed: Mar. 15, 2013; Date Mailed: Dec. 4, 2014; 37 pages.

U.S. Appl. No. 14/501,457, Non-Final Office Action; Date Filed Sep. 30, 2014; Date Mailed: Mar. 18, 2015; 29 pages.

U.S. Appl. No. 14/501,663; Non-Final Office Action; Date Filed: Sep. 30, 2014; Date Mailed: Dec. 19, 2014; 11 pages.

U.S. Appl. No. 14/501,945; Non-Final Office Action, Date Filed: Sep. 30, 2014; Date Mailed: Jan. 5, 2015; 29 pages.

U.S. Appl. No. 14/502,043; Non-Final Office Action; Date Filed: Sep. 30, 2014; Date Mailed: Dec. 23, 2014; 17 pages.

U.S. Appl. No. 13/833,886, Date Filed: Mar. 15, 2013; Non-Final Office Action, Date Mailed: Aug. 3, 2015; 18 pages.

U.S. Appl. No. 13/833,952; Non-Final Office Action, Date Filed: Mar. 15, 2013; Date Mailed: Aug. 5, 2015; 25 pages.

U.S. Appl. No. 13/833,796; Date Filed: Mar. 15, 2013; Non-Final Office Action; Date Mailed: Jul. 30, 2015, 21 pages.

U.S. Appl. No. 13/834,117; Date Filed: Mar. 15, 2013; Final Office Action; Date Mailed: Jul. 17, 2015, 31 pages.

U.S. Appl. No. 14/501,663; Date Filed: Sep. 30, 2014; Final Office Action; Date Mailed: Apr. 9, 2015; 25 pages.

U.S. Appl. No. 13/833,886; Final Office Action; Date Filed: Mar. 15, 2013; Date Mailed: Apr. 9, 2015; 19 pages.

U.S. Appl. No. 13/833,952, Final Office Action; Date Filed: Mar. 15, 2013; Date Mailed: Apr. 16, 2015; 25 pages.

U.S. Appl. No. 13/834,020; Date Filed Mar. 15, 2013; Notice of Allowance; Date Mailed: Apr. 21, 2015; 10 pages.

U.S. Appl. No. 13/834,502; Final Office Action; Date Filed: Mar. 15, 2013; Date Mailed: Jun. 29, 2015; 26 pages.

U.S. Appl. No. 14/501,457; Final Office Action; Date Filed: Sep. 30, 2014; Date Mailed: Jun. 29, 2015; 28 pages.

(56) References Cited

OTHER PUBLICATIONS

U.S. Appl. No. 13/833,796; Date Filed: Mar. 15, 2013; Final office action; Date Mailed: Jan. 15, 2016; 18 pages.
U.S. Appl. No. 13/834,117; Date Filed: Mar. 15, 2013; Non-final office Action; Date Mailed: Dec. 16, 2015; 30 pages.
U.S. Appl. No. 14/501,663; Date Filed: Sep. 30, 2014; Final office action; Date Mailed: Jan. 20, 2016; 15 pages.
Examination Report for Application No. GB1516352.0 Mailed Nov. 17, 2015.
U.S. Appl. No. 13/833,796; Non-Final Office Action, Date Filed: Mar. 15, 2013; Date Mailed: May 19, 2016; 29 pages.
U.S. Appl. No. 13/834,502; Non-Final Office Action; Date Filed: Mar. 15, 2013; Date Mailed: Jun. 14, 2016 45 pages.
U.S. Appl. No. 14/501,663; Non-Final Office Action; Date Filed Sep. 30, 2014; Date Mailed: May 17, 2016; 20 pages.

\* cited by examiner

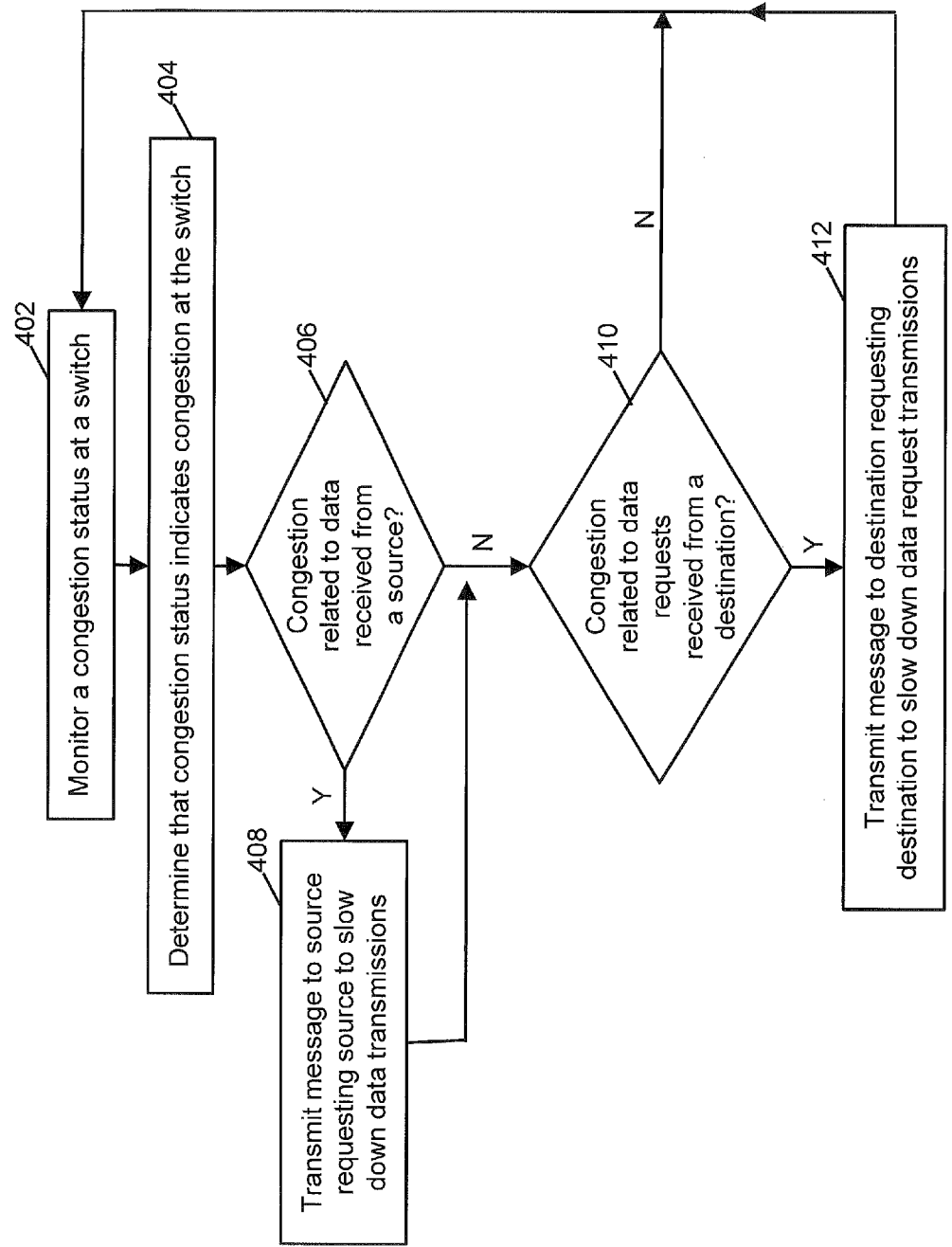

SCALABLE FLOW AND COGESTION CONTROL WITH OPENFLOW

This application is a continuation of U.S. patent application Ser. No. 13/833,952, filed Mar. 15, 2013, the content of which is incorporated by reference herein in its entirety.

BACKGROUND

The present invention relates to computer networks, and more specifically, to scalable flow and congestion control in a network.

Ethernet networks are typically employed in local area networks (LANs) that include a plurality of network switches. A number of communication protocols have been developed and continue to evolve to enhance Ethernet network performance for various environments. For example, an enhancement to Ethernet, called data center bridging (DCB), converged enhanced Ethernet (CEE) or data center Ethernet (DCE), supports the convergence of LANs with storage area networks (SANs). Other protocols that can be used in a data center environment in conjunction with Ethernet include, for instance, Fibre Channel over Ethernet (FCoE), Internet Wide Area Remote direct memory access Protocol (iWARP), Remote direct memory access over Converged Ethernet (RoCE).

In OpenFlow network environments, switches are connected via secure links to respective controllers, in order to control switch configuration and routing. Such controllers typically provide such control via data packets sent over the secure link, which maintain higher levels of data integrity than conventional Ethernet fabrics.

Typically, when data packets are forwarded by a switch through a specified port, the packets are queued in a switch buffer when there is an imbalance between incoming and outgoing packet rates. Network congestion is a problem that occurs when the switch carries so much data that buffer queue entries are exhausted or buffers are filled to some level relative to the buffer size. Such congestion results in a reduction of quality of service, causing packets to be dropped, or queuing and/or transmission of packets to be delayed.

SUMMARY

Embodiments include a method and computer program product for performing congestion management in a network that includes monitoring a congestion status at a switch in the network. It is determined that the congestion status indicates that there is congestion at the switch. Based on the congestion status being related to data received at the switch from a source at a first rate, a first message is transmitted from the switch to the source requesting the source to send the data at a second rate that is slower than the first rate. Based on the congestion status being related to data requests received at the switch from a destination at a third rate, a second message is transmitted from the switch to the destination requesting the destination to send the data requests at a fourth rate slower than the third rate.

Additional features and advantages are realized through the embodiments described herein. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 4 depicts a process for performing congestion management at a switch in accordance with an embodiment.

DETAILED DESCRIPTION

Embodiments are directed to providing scalable flow and congestion control at a switch in a network. Network congestion can occur when a data flow is received (e.g., at a network switch) from a source at a faster rate than the flow can be outputted or routed. In an embodiment where the network is an OpenFlow network, when data packets are forwarded by a switch through a specified port, the packets are queued in a switch buffer when there is an imbalance between incoming and outgoing packet rates. Network becomes a problem when the switch carries so much data that buffer queue entries are exhausted or buffers are filled to some level relative to the buffer size. Such congestion results in a reduction of quality of service, causing packets to be dropped, or queuing and/or transmission of packets to be delayed.

In contemporary OpenFlow networks, flow and congestion control is managed by an OpenFlow controller that is connected to all of the switches in the network. This centralized approach to flow and congestion control is contrasted with embodiments described herein where all or a portion of the flow and congestion control is managed by an OpenFlow-capable switch (also referred to herein as an "OpenFlow switch"). In an embodiment, an OpenFlow switch that detects congestion sends messages, independently of the OpenFlow controller, to sources and/or destinations that may be causing congestion at the switch. Relieving congestion at a switch may lead to less congestion in the overall network.

Figure 1:
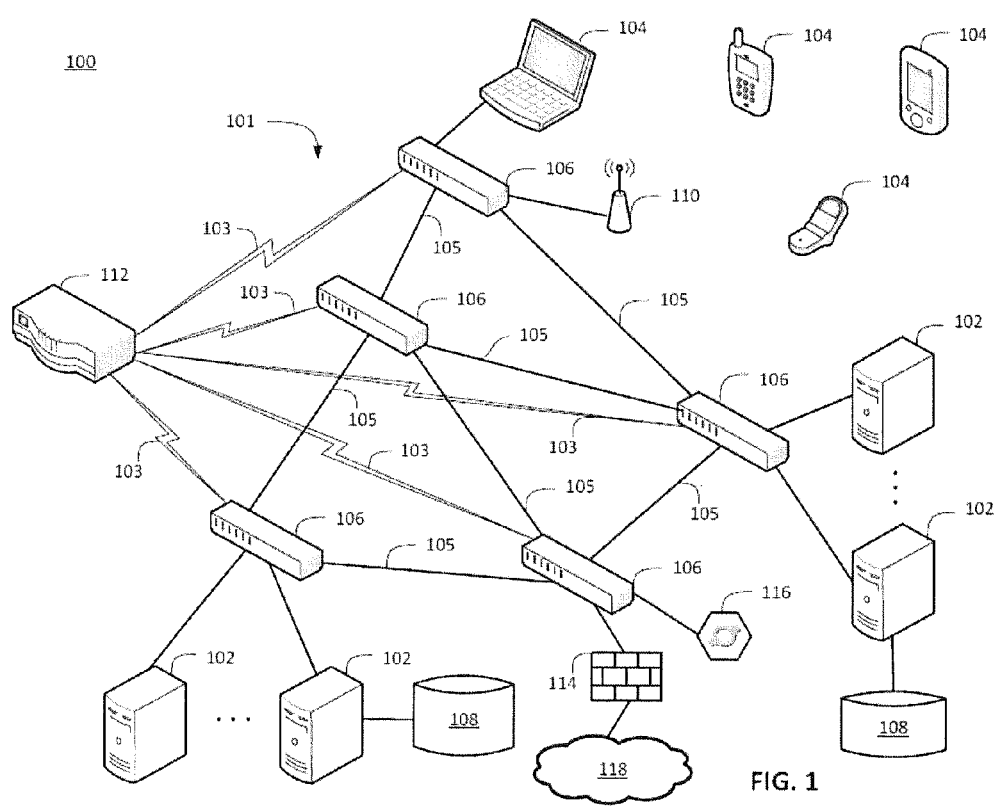
FIG. 1 depicts a block diagram of a system including a network with OpenFlow-capable switches that may be implemented according to an embodiment.

Turning now to FIG. 1, an example of a system 100 including a network 101 that supports OpenFlow (i.e., an OpenFlow network) will now be described in greater detail. In the example depicted in FIG. 1, the system 100 is a data center environment including a plurality of servers 102 and client systems 104 configured to communicate over the network 101 using switches 106 that are OpenFlow-capable. In exemplary embodiments, the servers 102, also referred as hosts or host systems, are high-speed processing devices (e.g., mainframe computers, desktop computers, laptop computers, hand-held devices, embedded computing devices, or the like) including at least one processing circuit (e.g., a computer processor/CPU) capable of reading and executing instructions, and handling interactions with various components of the system 100. The servers 102 may be storage system servers configured to access and store large amounts of data to one or more data storage systems 108.

The client systems 104 can include a variety of desktop, laptop, general-purpose computer devices, mobile computing devices, and/or networked devices with processing circuits and input/output (I/O) interfaces, such as keys/buttons, a touch screen, audio input, a display device and audio output. The client systems 104 can be linked directly to one or more of the switches 106 or wirelessly through one or more wireless access points 110.

The data storage systems 108 refer to any type of computer readable storage media and may include one or more secondary storage elements, e.g., hard disk drive (HDD), solid-state memory, tape, or a storage subsystem that is internal or external to the servers 102. Types of data that may be stored in the data storage systems 108 include, for example, various files and databases. There may be multiple data storage systems 108 utilized by each of the servers 102, which can be distributed in various locations of the system 100.

The system 100 also includes a network controller 112 that is a central software defined network controller configured to make routing decisions within the network 101. The network controller 112 establishes one or more secure links 103 to configure the switches 106 and establish communication properties of links 105 between the switches 106. For example, the network controller 112 can configure the switches 106 to control packet routing paths for data flows between the servers 102 and client systems 104, as well as one or more firewalls 114 and one or more load balancers 116. The one or more firewalls 114 restrict access and the flow of network traffic between the network 101 and one or more external networks 118. The one or more load balancers 116 can distribute workloads across multiple computers, such as between the servers 102.

The servers 102, client systems 104, and network controller 112 can include various computer/communication hardware and software technology known in the art, such as one or more processing units or circuits, volatile and non-volatile memory including removable media, power supplies, network interfaces, support circuitry, operating systems, and the like. Although the network controller 112 is depicted as a separate component, it will be understood that network configuration functionality can alternatively be implemented in one or more of the servers 102 or client systems 104 in a standalone or distributed format.

The network 101 can include a combination of wireless, wired, and/or fiber optic links. The network 101 as depicted in FIG. 1 represents a simplified example for purposes of explanation. Embodiments of the network 101 can include numerous switches 106 (e.g., hundreds) with dozens of ports and links per switch 106. The network 101 may support a variety of known communication standards that allow data to be transmitted between the servers 102, client systems 104, switches 106, network controller 112, firewalls(s) 114, and load balancer(s) 116. Communication protocols are typically implemented in one or more layers, such as a physical layer (layer-1), a link layer (layer-2), a network layer (layer-3), a transport layer (layer-4), and an application layer (layer-5). In exemplary embodiments, the network 101 supports OpenFlow as a layer-2 protocol. The switches 106 can be dedicated OpenFlow switches or OpenFlow-enabled general purpose switches that also support layer-2 and layer-3 Ethernet.

Figure 2:
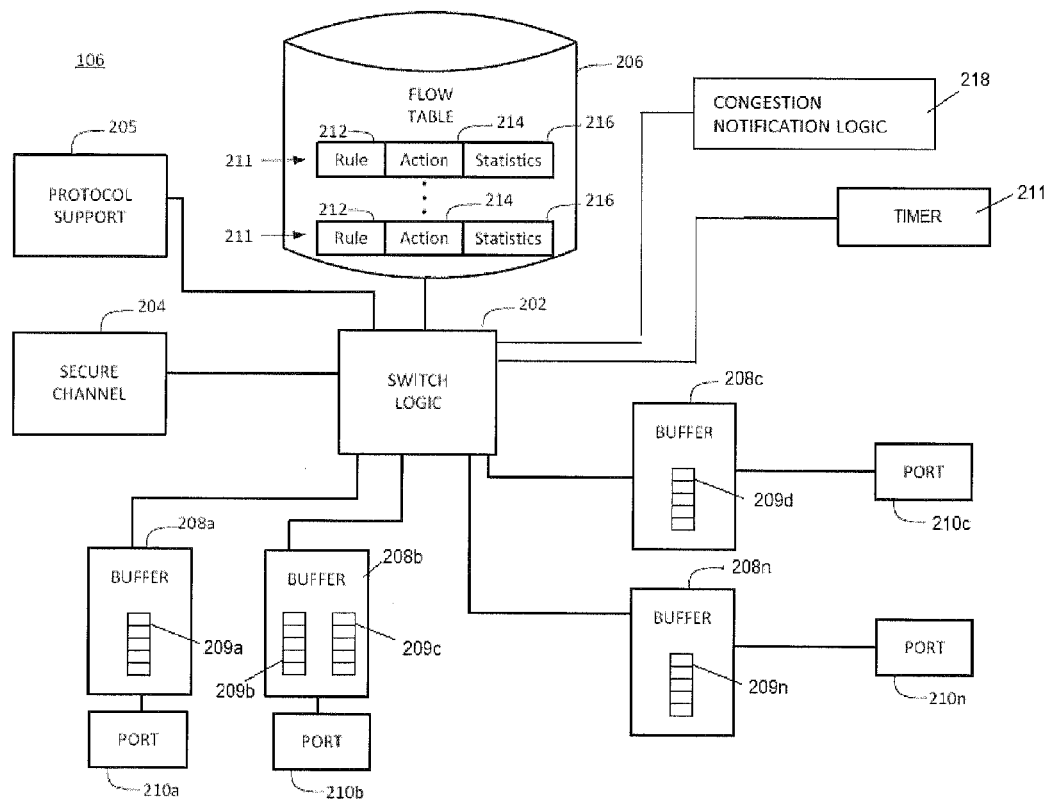
FIG. 2 depicts a block diagram of an OpenFlow-capable switch according to an embodiment.

FIG. 2 depicts a block diagram of the switch 106 of FIG. 1 that supports OpenFlow. The switch 106 includes switch logic 202, congestion notification logic 218, secure channel 204, protocol support 205, flow table 206, buffers 208a-208n including various queues 209a-209n, and ports 210a-210n. The switch 106 includes various counters or timers 211, such as timers associated with queues 209a-209n, the flow table 206 and/or flow table entries. The switch logic 202 and the congestion notification logic 218 may be implemented in one or more processing circuits, where a computer readable storage medium is configured to hold instructions for the switch logic 202, as well as various variables and constants to support operation of the switch 106. The switch logic 202 forwards packets between the ports 210a-210n as flows defined by the network controller 112 of FIG. 1. An embodiment of the congestion notification logic 218, which may be included in the switch logic 202, monitors the switch 106 for congestion and takes corrective actions if congestion is detected at the switch 106.

The secure channel 204 connects the switch 106 to the network controller 112 of FIG. 1. The secure channel 204 allows commands and packets to be communicated between the network controller 112 and the switch 106 via the OpenFlow protocol. The secure channel 204 can be implemented in software as executable instructions stored within the switch 106. Protocol details to establish a protocol definition for an implementation of OpenFlow and other protocols can be stored in the protocol support 205. The protocol support 205 may be software that defines one or more supported protocol formats. The protocol support 205 can be embodied in a computer readable storage medium, for instance, flash memory, which is configured to hold instructions for execution by the switch logic 202. Implementing the protocol support 205 as software enables updates in the field for new versions or variations of protocols and can provide OpenFlow as an enhancement to existing conventional routers or switches.

The flow table 206 defines supported connection types associated with particular addresses, virtual local area networks or switch ports, and is used by the switch to process data flows received at the switch. A data flow is a sequence of data packets grouped in some manner, e.g., by source and/or destination, or otherwise defined by selected criteria. Each data flow may be mapped to a port and associated queue based on the flow table 206. For example, a data flow is defined as all packets that match a particular header format.

Each entry 211 in the flow table 206 can include one or more rules 212, actions 214, and statistics 216 associated with a particular flow. The rules 212 define each flow and can be determined by packet headers. The actions 214 define how packets are processed. The statistics 216 track information such as the size of each flow (e.g., number of bytes), the number of packets for each flow, and time since the last matching packet of the flow or connection time. Examples of actions include instructions for forwarding packets of a flow to one or more specific ports 210a-210n (e.g., unicast or multicast), encapsulating and forwarding packets of a flow to the network controller 112 of FIG. 1, and dropping packets of the flow. Entries 211 in the flow table 206 can be added and removed by the network controller 112 of FIG. 1 via the secure channel 204. The network controller 112 of FIG. 1 can pre-populate the entries 211 in the flow table 206. Additionally, the switch 106 can request creation of an entry 211 from the network controller 112 upon receiving a flow without a corresponding entry 211 in the flow table 206.

The buffers 208a-208n provide temporary storage in queues 209a-209n for flows as packets are sent between the ports 210a-210n. In a lossless configuration, rather than dropping packets when network congestion is present, the buffers 208a-208n temporarily store packets until the associated ports 210a-210n and links 105 of FIG. 1 are available. Each of the buffers 208a-208n may be associated with a particular port, flow, or sub-network. Each of the buffers 208a-208n is logically separate but need not be physically independent. Accordingly, when one of the buffers 208a-208n is full, it does not adversely impact the performance of the other buffers 208a-208n within the switch 106.

For example, in an OpenFlow switch, each port 210*a*-210*n* is attached to a respective queue 209*a*-209*n*. In operation, when the switch 106 receives a packet, the switch 106 attempts to match the packet by comparing fields (referred to as "match fields") to corresponding fields in flow entries of each flow table 206. Exemplary match fields include ingress port and metadata fields, as well as header fields such as those described below in reference to FIG. 3. In one embodiment, matching starts at the first flow table and may continue to additional flow tables.

If no match is found, the switch 106 may perform an action based on the switch configuration, e.g., the packet may be forwarded to the controller or dropped. If the packet matches a flow entry in a flow table, the corresponding instruction set is executed based on the flow entry, e.g., the actions field 214. For example, when a packet is matched to a flow entry including an output action, the packet is forwarded to one of ports 210*a*-210*n* specified in the flow entry.

In one embodiment, forwarding the packet to a port includes mapping packets in a flow to a queue attached to the port. Such flows are treated according to the queue's configuration (e.g., minimum rate).

Figure 3:
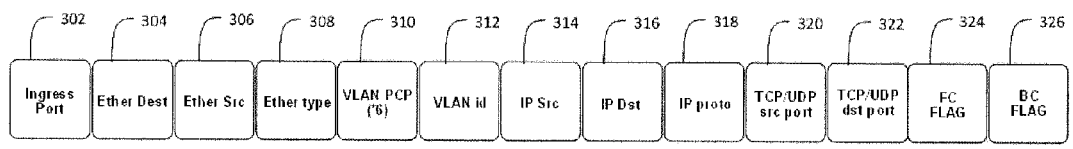
FIG. 3 depicts an example of an OpenFlow flow switching definition that can be used in embodiments.

FIG. 3 depicts an example of an OpenFlow flow switching definition 300 that can be used in embodiments. The OpenFlow flow switching definition 300 is a packet header that defines the flow (also referred to herein as the "data flow") and includes a number of fields. In this example, the switching definition 300 is a flow header that includes up to eleven tuples or fields; however, not all tuples need to be defined depending upon particular flows. In the example of FIG. 3, the OpenFlow flow switching definition 300 includes tuples for identifying an ingress port 302, an Ethernet destination address 304, an Ethernet source address 306, an Ethernet type 308, a virtual local area network (VLAN) priority 310, a VLAN identifier 312, an Internet protocol (IP) source address 314, an IP destination address 316, an IP protocol 318, a transmission control protocol (TCP)/user datagram protocol (UDP) source port 320, a TCP/UDP destination port 322, a forward congestion flag 324, and a backward congestion flag 326. The Ethernet destination address 304 may represent a layer-2 Ethernet hardware address or media access control (MAC) address used in legacy switching and routing. The IP destination address 316 may represent a layer-3 IP address used in legacy switching and routing. Flow switching can be defined for any combination of tuples in the OpenFlow flow switching definition 300, with a particular combination of tuples serving as a key. For example, flows can be defined in a rule 212 of FIG. 2 by exact matching or wildcard matching for aggregated MAC-subnets, IP-subnets, ports, VLAN identifiers, and the like. In an embodiment, the forward congestion flag 324 is used to indicate that a source of data for a data flow associated with the entry is sending data more quickly than the switch can process the data. In an embodiment, the backward congestion flag 326 is used to indicate that a destination of data requests for the data flow is requesting the data more quickly than the switch can process the data requests.

FIG. 4 depicts a process for performing congestion management at a switch in a network in accordance with an embodiment. In an embodiment, the process shown in FIG. 4 is performed by the congestion notification logic 218. At block 402, a congestion status at a switch is monitored. In an embodiment, the monitoring is performed by examining all or a subset of the buffers 208*a*-208*n* and/or queues 209*a*-209*n* located on the switch. In an OpenFlow network each data flow may be mapped, e.g., by the flow table 206, to an associated buffer or queue. In an embodiment, when a data packet for a data flow is received at the switch, one or more queues associated with the data flow is examined to determine if it contains more than a specified number of entries. The specified number of entries may be expressed in terms of an actual number and/or in terms of a percent of the queue that is full. When the queue is determined to be over the specified number of entries either the forward congestion flag 324 or the backward congestion flag 326 is set (e.g., based on whether the queue stores data or data requests) in the header associated with the data flow. In another embodiment, all or a subset of the queues 209*a*-209*n* are examined periodically and based on determining that a queue contains more than a specified number of entries (this number may be different for different queues), it is determined which data flow is associated with the queue, and a flag (e.g., a forward congestion flag 324, a backward congestion flag 326) is set in the entry (e.g., the header or rule 212) for the data flow in the flow table 208.

In an embodiment, the switch (attached e.g., to a server, client system, a controller, another switch, or other component connected to the network) is an OpenFlow switch and the network is an OpenFlow network. In an embodiment the source and destination switches (attached e.g., to a server, client system, a controller, another switch, or other component connected to the network) may include one or both of OpenFlow-enabled switches and non-OpenFlow-enabled switches.

At block 404, it is determined that there is congestion at the switch. In an embodiment, this is determined by examining the flags (e.g., the forward congestion flag 324, the backward congestion flag 326) associated with a data flow. In an embodiment, the flags are examined each time (or every x number of times) that a packet for the data flow is received at the switch. In another embodiment, the flags are examined periodically. In a further embodiment, a notification is sent when the flags are set.

At block 406, it is determined whether the congestion is related to data received from a source. In an embodiment, the congestion is related to data received from a source when the forward congestion flag 324 is set.

Block 408 is performed if it is determined, at block 406, that the congestion is related to data received from a source. Alternatively, block 410 is performed if it is determined, at block 406, that the congestion is not related to data received from a source.

At block 408, a message is transmitted to the source requesting the source to slow down data transmission to the switch. In an embodiment, once the message is sent to source, the switch continues to monitor the congestion status. If it is determined that the congestion no longer exists for the data flow at the switch, a message is transmitted to the source requesting the source to send data at a faster rate (e.g., the same as the original rate, or some other rate). Processing then continues at block 410.

At block 410, it is determined whether the congestion is related to data requests received from a destination. In an embodiment, the congestion is related to data requests received from a destination when the backward congestion flag 326 is set.

Block 412 is performed if it is determined, at block 410, that the congestion is related to data requests received from a destination. Alternatively, processing continues at block 402 if it is determined, at block 410, that the congestion is not related to data requests received from a destination.

At block 412, a message is transmitted to the destination requesting the destination to slow down data request transmissions to the switch. In an embodiment, once the message is sent to destination, the switch continues to monitor the congestion status. If it is determined that the congestion no longer exists for the data flow at the switch, a message is transmitted to the destination requesting the destination to send data requests at a faster rate (e.g., the same as the original rate, or some other rate). Processing then continues at block 402.

In an embodiment, one or more of the messages requesting a source or destination to slow down (or to speed up) transmission of data or data packets are inserted into a physical frame and sent to the source (e.g., a switch or component attached to a switch) via the network. In an embodiment, the physical frames are forward explicit congestion notification (FECN) or backward explicit congestion notification (BECN) frames. Because FECN and BECN frames are control frames, they may be given a higher priority by the network and/or at the receiving switch and therefore processed with a higher priority than (e.g., before) data or data request frames, thus resulting in a lower latency for these messages. The different priorities may be implemented in an SDN by utilizing a virtual plane for data and a separate virtual plane for control.

In an embodiment, the logic performing the monitoring and flag setting (e.g., block 402) executes independently of the logic that is determining whether to send messages and sending the messages (e.g., block 404-412).

In an embodiment, the monitoring sets a flag that indicates that the switch can handle an incoming data or requests at a faster rate (e.g., the queue is below a threshold value). In this case, the switch may request the source and/or destination to send data at a faster rate than the current rate.

Technical effects include the ability to implement flow control and congestion management at a switch in a network (e.g., an OpenFlow network).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible and non-transitory storage medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of performing congestion management in a network, the method comprising:

monitoring, at a physical switch in the network, both data packets and data requests received at the switch over one or more links in the network;

based on the monitoring, determining a congestion status at the switch;

determining, at the switch, that the congestion status indicates that there is congestion at the switch, the determining including examining a plurality of flags in a header field of an entry corresponding to a flow in a flow table at the switch, the plurality of flags including a forward congestion flag that when set indicates that a source of the data packets for the data flow is sending the data packets more quickly than the switch can process the data packets, and a backward congestion flag that when set indicates that a destination of the data packets for the data flow is sending the data requests more quickly than the switch can process the data requests;

based on the forward congestion flag being set and congestion being related to the data packets received at the switch from the source at a first rate, transmitting a first message from the switch to the source, the first message requesting the source to send the data packets at a second rate that is slower than the first rate; and based on the backward congestion flag being set and congestion being related to the data requests received at the switch from the destination at a third rate, transmitting a second message from the switch to the destination, the second message requesting the destination to send the data requests at a fourth rate that is slower than the third rate.

2. The method of claim 1, further comprising:
based on transmitting the first message:
   monitoring the congestion status at the switch in the network; and
   based on determining that the congestion status indicates that there is no longer congestion at the switch related to the data packets received at the switch from the source, transmitting a third message from the switch to the source requesting the source to send the data packets at a fifth rate that is faster than the second rate.

3. The method of claim 1, further comprising:
based on transmitting the second message:
   monitoring the congestion status at the switch in the network; and
   based on determining that the congestion status indicates that there is no longer congestion at the switch related to the data requests received at the switch from the destination, transmitting a fourth message to the destination requesting the destination to send the data requests at a sixth rate that is faster than the fourth rate.

4. The method of claim 1, wherein the switch, the source, and the destination are OpenFlow switches and the network is an OpenFlow network.

5. The method of claim 1, wherein the switch is an OpenFlow switch.

6. The method of claim 5, wherein the forward congestion flag is set to indicate congestion at the switch related to the data packets received at the switch based on a queue at the switch that stores the data packets exceeding a specified capacity.

7. The method of claim 5, wherein the backward congestion flag is set to indicate congestion at the switch related to the data requests received at the switch based on a queue at the switch that stores the data requests exceeding a specified capacity.

8. A computer program product for congestion management in a network, the computer program product comprising:
- a tangible storage medium readable by a processing circuit and storing instructions for execution by the processing circuit for performing a method comprising:
  - monitoring, at a physical switch in the network, both data packets and data requests received at the switch over one or more links in the network;
  - based on the monitoring, determining a congestion status at the switch in the network;
  - determining, at the switch, that the congestion status indicates that there is congestion at the switch, the determining including examining a plurality of flags in a header field of an entry corresponding to a flow in a flow table at the switch, the plurality of flags including a forward congestion flag that when set indicates that a source of the data packets for the data flow is sending the data packets more quickly than the switch can process the data packets, and a backward congestion flag that when set indicates that a destination of the data packets for the data flow is sending the data requests more quickly than the switch can process the data requests;
  - based on the forward congestion flag being set and congestion being related to the data packets received at the switch from the source at a first rate, transmitting a first message from the switch to the source, the first message requesting the source to send the data packets at a second rate that is slower than the first rate; and
  - based on the backward congestion flag being set and congestion being related to the data requests received at the switch from the destination at a third rate, transmitting a second message from the switch to the destination, the second message requesting the destination to send the data requests at a fourth rate that is slower than the third rate.

9. The computer program product of claim 8, wherein the method further comprises:
- based on transmitting the first message:
  - monitoring the congestion status at the switch in the network; and
  - based on determining that the congestion status indicates that there is no longer congestion at the switch related to the data packets received at the switch from the source, transmitting a third message to the source requesting the source to send the data packets at a fifth rate that is faster than the second rate.

10. The computer program product of claim 8, wherein the method further comprises:
- based on transmitting the second message:
  - monitoring the congestion status at the switch in the network; and
  - based on determining that the congestion status indicates that there is no longer congestion at the switch related to the data requests received at the switch from the destination, transmitting a fourth message to the destination requesting the destination to send the data requests at a sixth rate that is faster than the fourth rate.

11. The computer program product of claim 8, wherein the switch, the source, and the destination are OpenFlow switches and the network is an OpenFlow network.

12. The computer program product of claim 8, wherein the switch is an OpenFlow switch.

13. The computer program product of claim 12, wherein the forward congestion flag is set to indicate congestion at the switch related to the data packets received at the switch based on a queue at the switch that stores the data packets exceeding a specified capacity.

14. The computer program product of claim 12, wherein the backward congestion flag is set to indicate congestion at the switch related to the data requests received at the switch based on a queue at the switch that stores the data requests exceeding a specified capacity.

* * * * *